(12) United States Patent
Takachi (10) Patent No.: US 8,777,804 B2
(45) Date of Patent: Jul. 15, 2014

(54) BICYCLE CONTROL APPARATUS

(71) Applicant: Shimano Inc., Osaka (JP)

(72) Inventor: Takeshi Takachi, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/746,567

(22) Filed: Jan. 22, 2013

(65) Prior Publication Data

US 2013/0267376 A1    Oct. 10, 2013

(30) Foreign Application Priority Data

Apr. 6, 2012    (JP) ................................ 2012-087075

(51) Int. Cl.
- *B60K 1/02* (2006.01)
- *B62M 6/50* (2010.01)

(52) U.S. Cl.
USPC ........................................... 477/3; 180/206.3

(58) Field of Classification Search
None
See application file for complete search history.

(56) References Cited

U.S. PATENT DOCUMENTS

| | | | | |
|---|---|---|---|---|
| 5,370,200 A * | 12/1994 | Takata | .................. | 180/206.4 |
| 5,992,553 A * | 11/1999 | Morrison | .................. | 180/206.2 |
| 6,012,538 A * | 1/2000 | Sonobe et al. | .................. | 180/220 |
| 6,196,347 B1 * | 3/2001 | Chao et al. | .................. | 180/206.2 |
| 6,263,992 B1 * | 7/2001 | Li | .................. | 180/206.3 |
| 7,357,209 B2 * | 4/2008 | Kokatsu et al. | .................. | 180/206.2 |
| 8,550,199 B2 * | 10/2013 | Moeller et al. | .................. | 180/206.3 |
| 8,640,805 B2 * | 2/2014 | Kuroki | .................. | 180/206.1 |
| 8,646,560 B2 * | 2/2014 | Chan | .................. | 180/206.3 |
| 2013/0054068 A1 | 2/2013 | Shoge | | |
| 2013/0090819 A1 | 4/2013 | Cheng | | |

FOREIGN PATENT DOCUMENTS

| | | |
|---|---|---|
| JP | 9-58569 A | 3/1997 |
| JP | 9-240568 A | 9/1997 |
| JP | 11-180376 A | 7/1999 |
| JP | 3717076 B2 | 9/2005 |
| JP | 2013-47083 A | 3/2013 |

\* cited by examiner

*Primary Examiner* — Dirk Wright
(74) *Attorney, Agent, or Firm* — Global IP Counselors (57) ABSTRACT

A bicycle control apparatus is configured to control a bicycle having a transmission and a drive assistance electric motor that drives a wheel. The bicycle control apparatus includes a pedaling force detector and a controller. The pedaling force detector detects a pedaling force. The controller includes a control section that controls the drive assistance electric motor according to a pedaling force detected by the pedaling force detector. The control section increases a ratio of an output of the drive assistance electric motor with respect to the pedaling force upon completion of a downshift of the transmission, and subsequently decreasing the ratio of the output of the drive assistance electric motor with respect to the pedaling force.

13 Claims, 9 Drawing Sheets

BICYCLE CONTROL APPARATUS

CROSS-REFERENCE TO RELATED APPLICATIONS

This application claims priority under 35 U.S.C. §119 to Japanese Patent Application No. 2012-087075, filed Apr. 6, 2012. The entire disclosure of Japanese Patent Application No. 2012-087075 is hereby incorporated herein by reference.

BACKGROUND

1. Field of the Invention

This invention generally relates to a bicycle control apparatus that controls a bicycle having a transmission and an electric motor for drive assistance.

2. Background Information

Electrically assisted bicycles that assist riding by supplementing a person's pedaling force with a motor drive force are becoming popular. Japanese Laid-Open Patent Publication No. 9-58569 discloses an electrically assisted bicycle equipped with a transmission. With this bicycle, a force exerted against a pedal by a person is transmitted through a chain to the transmission, modified according to the gear ratio of the transmission, and then transmitted to a rear wheel. The bicycle is also equipped with a drive assistance electric motor configured to transmit a drive force to the rear wheel.

SUMMARY

With the bicycle disclosed in Japanese Laid-Open Patent Publication No. 9-58569, when a downshift operation is executed and the transmission downshifts, the pedaling force decreases and the assistance force produced by the drive assistance electric motor decreases because it is determined in response to the pedaling force. Consequently, the assistance force feels insufficient when climbing, which is when assistance from the drive assistance electric motor is particularly desired.

One object presented in the present disclosure is to improve the riding comfort of a bicycle that is assisted with a drive assistance electric motor.

A bicycle control apparatus according to a first aspect is configured to control a bicycle having a transmission and a drive assistance electric motor that drives a wheel. The bicycle control apparatus comprises a pedaling force detector and a controller. The pedaling force detector detects a pedaling force. The controller includes a control section that controls the drive assistance electric motor according to a pedaling force detected by the pedaling force detector. The control section increases a ratio of an output of the drive assistance electric motor with respect to the pedaling force upon completion of a downshift of the transmission, and subsequently decreasing the ratio of the output of the drive assistance electric motor with respect to the pedaling force.

With this bicycle control apparatus, the drive assistance electric motor is controlled according to the pedaling force detected by the pedaling force detector and the ratio of the output of the drive assistance electric motor with respect to the pedaling force is increased after a downshift that will cause the assistance force of the drive assistance electric motor to weaken in response to a decrease of the pedaling force. Thus, even if the pedaling force decreases after a downshift, the decrease of the assistance force can be suppressed. As a result, the tendency of a rider to feel that the assistance force is insufficient after a downshift can be suppressed and the riding comfort can be improved.

Also, after the ratio of the output of the drive assistance electric motor with respect to the pedaling force has been increased, the ratio of the output of the drive assistance electric motor with respect to the pedaling force is decreased. Thus, the consumption of electric power necessary to operate the drive assistance electric motor can be suppressed.

A bicycle control apparatus according to a second aspect is the bicycle control apparatus according to the first aspect, further comprising a gear state detector configured to detect a position of the transmission. The control section determines if a downshift of the transmission has been completed based on the detection result of the gear state detector. With this aspect, the control section can determine that the downshift has been completed when the transmission has transitioned to a post-downshift state.

A bicycle control apparatus according to a third aspect is the bicycle control apparatus according to the first aspect, further comprising a gear state detector configured to executes a gear shifting operation of the transmission; and a gear state detector configured to detect a position the gear shifter. The control section determines if the downshift operation of the transmission has been completed based on a detection result of the gear state detector. With this aspect, the control section can determine that the downshift has been completed when the transmission has transitioned to the post-downshift state.

A bicycle control apparatus according to a fourth aspect is the bicycle control apparatus according to any one of the first to third aspects, wherein the control section decreases the ratio of the output of the drive assistance electric motor with respect to the pedaling force by returning the ratio of the output of the drive assistance electric motor to a state that existed before the ratio was increased. With this aspect, since the ratio of the output of the drive assistance electric motor with respect to the pedaling force is returned to the ratio that existed before the increase, the ratio of the output of the drive assistance electric motor with respect to the pedaling force can ultimately be held constant for every gear.

A bicycle control apparatus according to a fifth aspect is the bicycle control apparatus according to any one of the first to fourth aspects, further comprising a prescribed condition detector that detects a prescribed condition. The control section decreases the ratio of the output of the drive assistance electric motor with respect to the pedaling force upon the prescribed condition detector detects a prescribed condition. With this aspect, the ratio of the output of the drive assistance electric motor with respect to the pedaling force remains increased until the prescribed condition is detected. As a result, the output of the drive assistance electric motor can be prevented from decreasing undesirably.

A bicycle control apparatus according to a sixth aspect is the bicycle control apparatus according to the fifth aspect, wherein the prescribed condition detector detects the prescribed condition as a rotational speed of a crank of the bicycle exceeding a prescribed rotational speed. When the rotational speed of the crank becomes faster than the prescribed rotational speed after downshifting, the speed of the bicycle can be assumed to have increased to a certain degree and the assistance force is reduced to suppress the consumption of electric power.

A bicycle control apparatus according to a seventh aspect is the bicycle control apparatus according to the sixth aspect, wherein the prescribed condition detector is a crank rotational speed sensor that detects the rotational speed of the crank of the bicycle.

A bicycle control apparatus according to an eighth aspect is the bicycle control apparatus according to the eighth aspect, wherein the prescribed condition detector detects the prescribed condition upon a prescribed amount of time elapsing since the downshift of the transmission was detected as being complete. With this aspect, the configuration is simple because the ratio of the output is decreased based on an amount of time measured by a time measuring device.

A bicycle control apparatus according to the ninth aspect is the bicycle control apparatus according to the eight aspect, wherein the prescribed condition detector comprises a timer. With this aspect, the prescribed condition can be detected based on a timer contained in the control section.

A bicycle control apparatus according to a tenth aspect is the bicycle control apparatus according to any one of the first to ninth aspects, wherein the transmission is an internal transmission.

A bicycle control apparatus according to an eleventh aspect is the bicycle control apparatus according to any one of the first to ninth aspects, wherein the transmission is an external transmission.

A bicycle control apparatus according to a twelfth aspect is the bicycle control apparatus according to any one of the first to eleventh aspects, wherein the drive assistance electric motor is provided on one of the wheels of the bicycle, i.e., a front wheel or a rear wheel, or a frame of the bicycle.

A bicycle control method according to a thirteenth aspect is a method of controlling a bicycle having a transmission and a drive assistance electric motor that drives a wheel. The bicycle control method comprises detecting a pedaling force applied to the bicycle, detecting a downshift operation of the transmission, and increasing a ratio of the output of the drive assistance electric motor with respect to the pedaling force upon detecting the a downshift operation of the transmission is completed, and subsequently decreasing a ratio of an output of the drive assistance electric motor with respect to the pedaling force.

With this bicycle control method, the drive assistance electric motor is controlled according to the pedaling force detected by the pedaling force detecting section and the ratio of the output of the drive assistance electric motor with respect to the pedaling force is increased after a downshift that will cause the assistance force of the drive assistance electric motor to weaken in response to a decrease of the pedaling force. Thus, even if the pedaling force decreases after a downshift, the decrease of the assistance force can be suppressed.

With the disclosed bicycle control apparatus, the ratio of the output of the drive assistance electric motor with respect to the pedaling force is increased after a downshift that will cause the assistance force of the drive assistance electric motor to weaken in response to a decrease of the pedaling force. Thus, even if the pedaling force decreases after a downshift, the decrease of the assistance force can be suppressed and the tendency of a rider to feel that the assistance force is insufficient after a downshift can be suppressed. As a result, the riding comfort can be improved.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
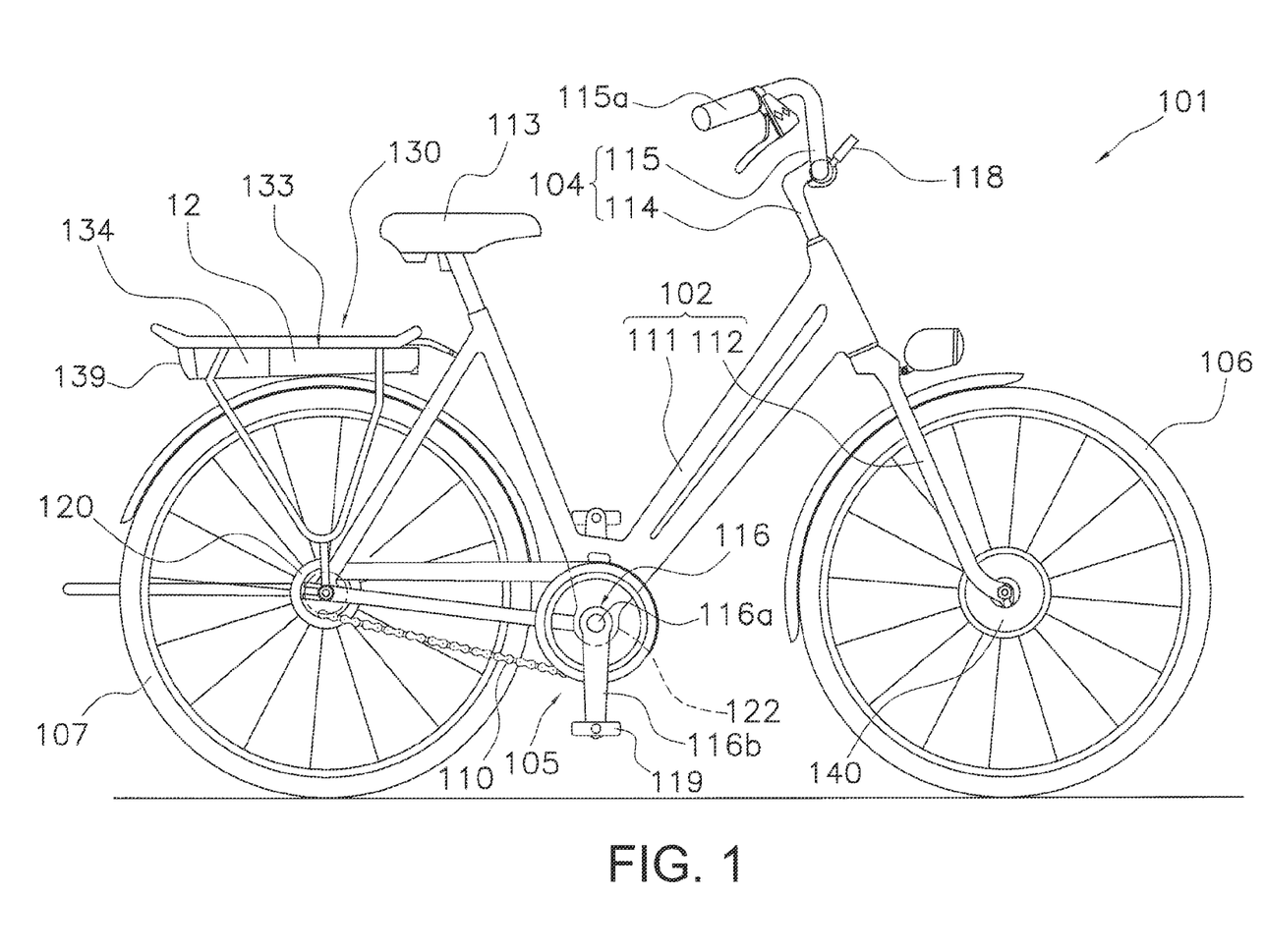
FIG. 1 is a side elevational view of a bicycle that is equipped with a bicycle control apparatus in accordance with a first embodiment.

FIG. 1 shows a bicycle 101 that employs a bicycle control apparatus according to a first embodiment. The bicycle 101 comprises chiefly a frame 102, a handlebar unit 104, a display device 124, a front wheel 106, a rear wheel 107, a chain 110, a crank 116, an internal transmission 120, a rear carrier 130, a rechargeable battery 134, an assistance motor unit 140, a controller 117 that constitutes a part of the bicycle control apparatus, and a front brake device and a rear brake device that are not shown in the drawings. The chain 110, the crank 116, the controller 117, the internal transmission 120 and the assistance motor unit 140 are parts of a bicycle drive system of the bicycle 101 for propelling the bicycle 101.

The frame 102 has a frame body 111 and a front fork 112. The front fork 112 is attached to a frontward portion of the frame body 111 such that it can pivot about a slanted axis. A saddle 94, the handlebar unit 104, and other components are attached to frame 102.

The crank 116 comprises a crank axle 116a and a left-right pair of crank arms 116b and 116c that are provided on axially opposite ends of the crank axle 116a and arranged 180 degrees out of phase from each other. The crank axle 116a is rotatably supported in a hanger section 127 of the frame body 111. Pedals 113 are attached to the free ends of the left and right crank arms 116b and 116c. The chain 110 is arranged on a front sprocket fixed to the right crank arm 116c and a rear sprocket provided on an internally geared hub 121 of the internal transmission 120 (explained later).

Figure 3:
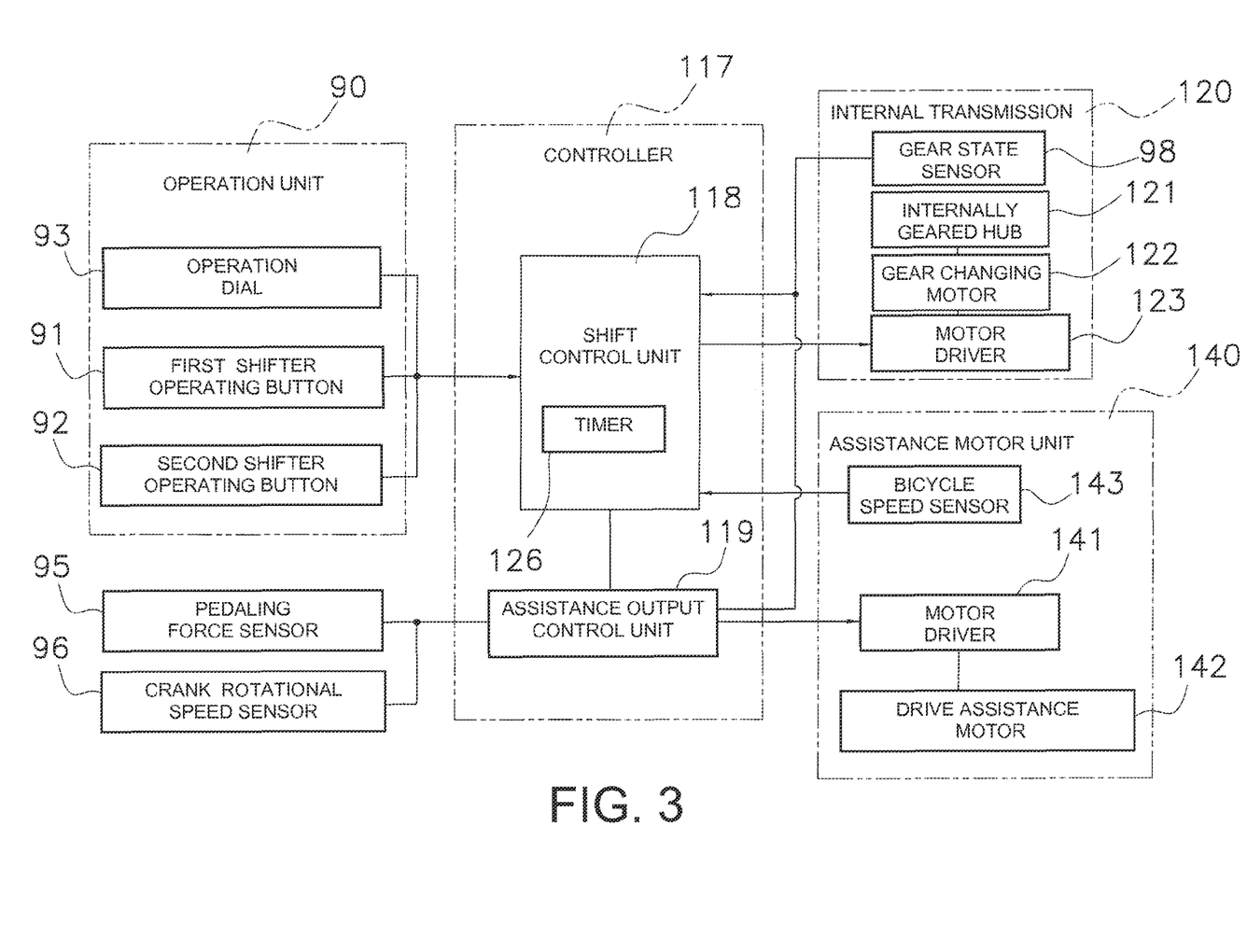
FIG. 3 is a block diagram of the bicycle control apparatus in accordance with the first embodiment.

As shown in FIG. 3, the internal transmission 120 comprises the internally geared hub 121, a gear changing motor 122, a motor driver 123, and a gear state sensor 98. The internally geared hub 121 is driven by the chain 110 and arranged at a center portion of the rear wheel 107. The internally geared hub 121 has a plurality of gears, e.g., eight gears. The internally geared hub 121 is a gear changing mechanism that includes a planetary gear mechanism. The gear changing motor 122 is coupled to the internally geared hub 121 and serves to electrically drive the gear changing mechanism. The motor driver 123 receives a signal from a shift control unit 118 explained later and drives the gear changing motor 122. The gear state sensor 98 detects a gear state of the internally geared hub 121, i.e., which of the gears is in an engaged state. The gear state sensor 98 is an example of a gear state detecting section or a gear state detector and is realized with, for example, a potentiometer. The detection result of the gear state sensor 98 is sent to the shift control unit 118 and the assistance output control unit 119. Also, the rear brake device is coupled to the internally geared hub 121.

The handlebar unit 104 has a handlebar stem 114 fixed to an upper portion of the front fork 112 and a handlebar 115 that is fixed to the handlebar stem 114. A brake lever and a grip 115a are attached to each of both ends of the handlebar 115.

Figure 2:
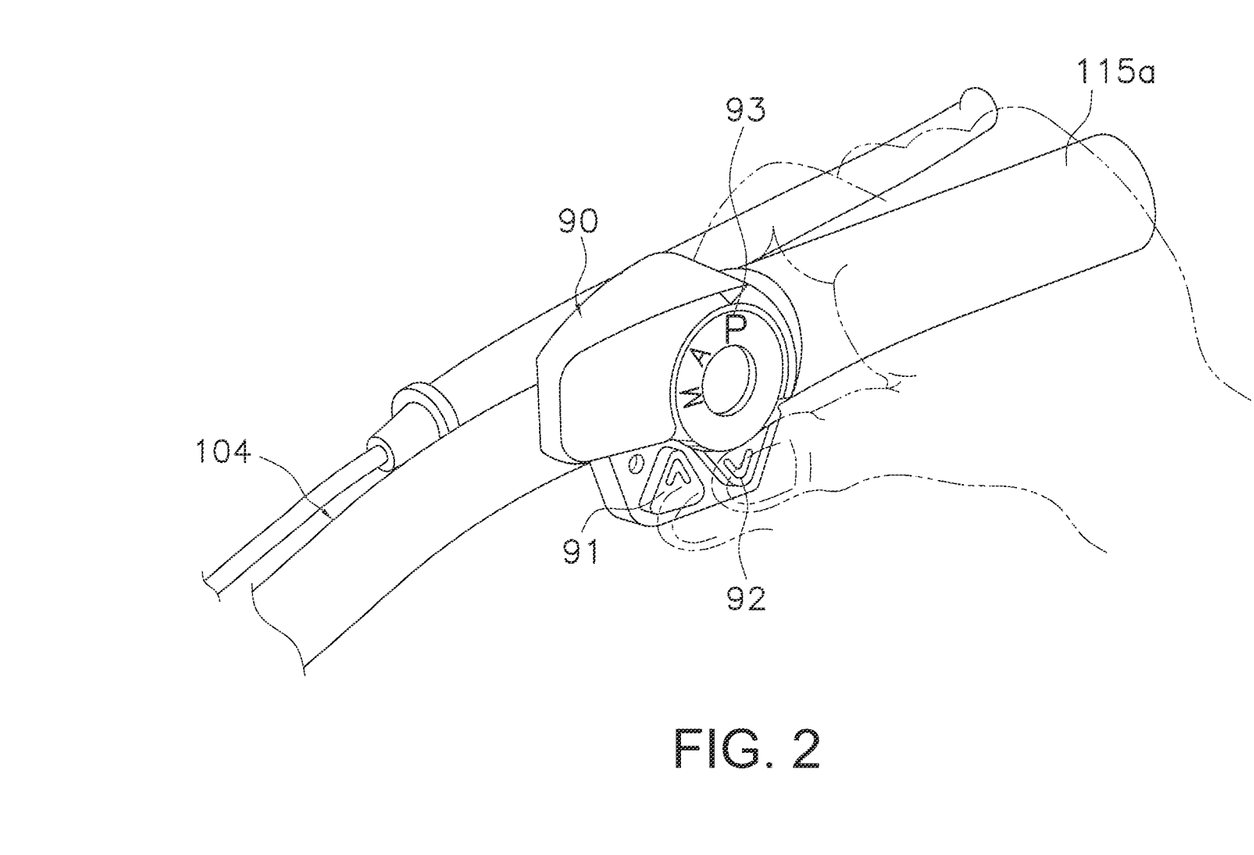
FIG. 2 is a perspective view showing a gear shifter unit attached to a handlebar.

As shown in FIG. 2, a gear shifter unit 90 is attached to the handlebar 104 near the grip 115a. The gear shifter unit 90 is a single unit integrating a first shifter operating button 91, a second shifter operating button 92, and an operating dial 93. The first and second shifter operating buttons 91 and 92 and the operating dial 93 are positioned such that a person can operate them by hand while gripping the grip 115a. The first and second shifter operating buttons 91 and 92 are pushbuttons. The first shifter operating button 91 on the left side is a button for upshifting from a lower gear to a higher gear. The second shifter operating button 92 on the right side is a button for downshifting from a higher gear to a lower gear. The operating dial 93 is a dial for switching between two shifting modes and a parking (P) mode and has three stop positions: P, A and M. The two shifting modes are an automatic shifting mode (A) and a manual shifting mode (M). The automatic shifting mode is a mode in which the internally geared hub 121 of the internal transmission 120 is shifted automatically based on a bicycle speed signal from a bicycle speed sensor 143 (explained later). The manual shifting mode is a mode in which the internally geared hub 121 is shifted to any desired gear by operating the first and second shifter operating buttons 91 and 92. The parking mode is a mode in which rotation of the rear wheel 107 is restricted by locking the internally geared hub 121.

The display device 124 is fixed to the handlebar 115. The display device 124 has a liquid crystal display screen and serves to display such information as the shift mode, the speed of the bicycle, the gear position, the distance traveled, and the remaining capacity of the rechargeable battery 134.

The rear carrier 130 is attached to a rearward portion of the frame body 111. A rear carrier unit 133 that includes the controller 117 is attached to the rear carrier 130. The rechargeable battery 134 is removably installed in the rear carrier unit 133. The rechargeable battery 134 serves as a power source for the gear changing motor 122, the drive assistance motor 142 (explained later), the controller 117, and other parts that require electric power to operate. The rechargeable battery 134 is a storage battery that uses, for example, a nickel chloride cell or a lithium ion cell. A tail lamp 139 is attached to the rechargeable battery 134 so as to form an integral unit.

The assistance motor unit 140 is attached to a center portion of the front wheel 106 and serves to apply an assistance drive force to the front wheel 106. It is acceptable for a front brake device comprising, for example, a roller brake device to be connected to the assistance motor unit 140. If the front brake device is not connected to the assistance motor unit 140, then the front brake device can be provided on the front fork 12. As shown in FIG. 3, the drive assistance motor 142, a motor driver 141, and the bicycle speed sensor 143 are provided inside the assistance motor unit 140. The drive assistance motor is an example of a drive assistance electric motor. The drive assistance motor 142 is, for example, a three-phase brushless DC motor or an AC motor. The inverter 141 converts a direct current outputted from the power storage section 134 into an alternating current suitable for driving the assist motor 142. The bicycle speed sensor 143 detects the rotational speed of the drive assistance motor 142, i.e., the speed of the bicycle 101.

The assistance motor unit 140 generates a supplementary torque corresponding to a rider's pedaling force utilizing the drive assistance motor 142. The torque corresponding to the pedaling force of the rider is, for example, a torque equal to the product of the torque acting on the crank axle 116a and a prescribed value. The torque of the drive assistance motor 142 is transmitted to the rear wheel 106. The pedaling force resulting when a rider depresses a pedal 113 is detected by a pedaling force sensor 95. The pedaling force can be expressed, for example, as a torque acting on the crank axle 116a. The pedaling force sensor 95 is an example of a pedaling force detecting section or a pedaling force detector. The drive assistance motor 142 is controlled based on a crank rotational speed sensor 96. The crank rotational speed sensor 96 is an example of a prescribed condition detecting component.

The pedaling force sensor 95 is attached to the hanger section 127 of the frame 102. The pedaling force sensor 95 detects a torque of the crank axle 116a in a non-contact manner or by contacting the crank axle 116a or the crank arm 116b. The pedaling force sensor 95 is, for example, 1) a magnetorestrictive sensor having a magnetorestrictive element provided on the crank axle 116a and a detection coil arranged facing opposite the magnetorestrictive element, 2) a strain gauge provided on the crank axle 116a or the crank arm 116b, or 3) a strain gauge provided on a supporting portion supporting the crank axle 116a. The pedaling force sensor 95 is not limited to these configurations and any sensor whose output varies according to the torque acting on the crank axle 116a is acceptable. The pedaling force sensor 95 sends a signal that changes according to the pedaling force acting on the crank axle 116a to the controller 117.

Figure 4:
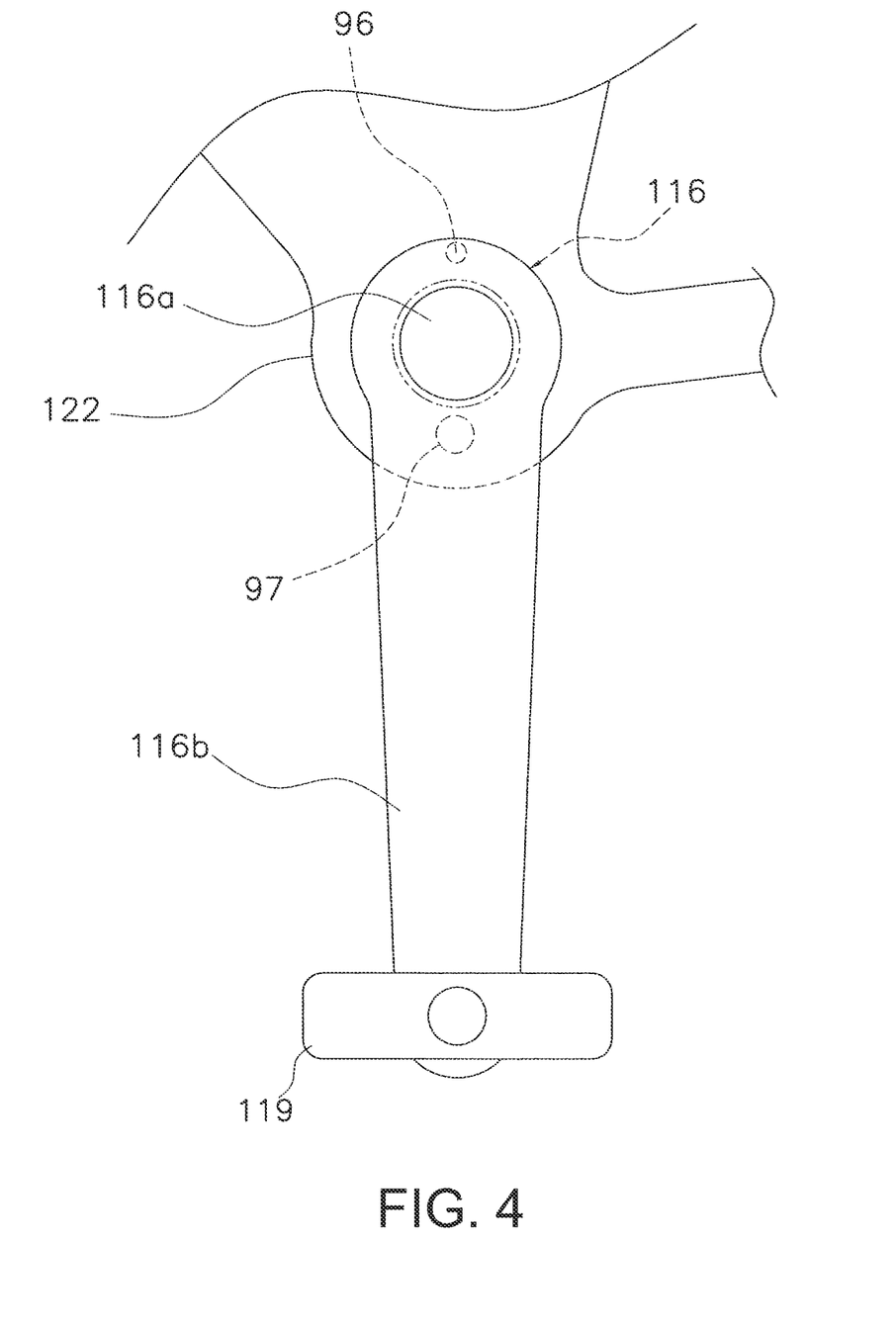
FIG. 4 is an enlarged side elevational view of a crank arm with a crank rotational speed sensor.

The crank rotational speed sensor 96 detects a magnet 97 provided at a base end of the left crank arm 116b as shown in FIG. 4. The crank rotational speed sensor 96 employs, for example, a Hall element, a Reed switch or another magnetic force detecting member. The crank rotational speed sensor 96 is fixed to the hanger section 127 in such a position that it can face across from the magnet 97.

The controller 117 constituting a part of the bicycle control apparatus is arranged inside the rear carrier unit 133 as explained previously. The controller 117 includes a microcomputer, and serves to control electrical components to which it is electrically connected. The controller 117 includes a CPU (central processing unit), a RAM (random access memory), a ROM (read only memory), an I/O interface, and a timer 126 and comprises several functional sections. As shown in FIG. 3, the functional sections of the controller 117 include an assistance output control unit 119 that controls the output of the drive assistance motor 142 and a gear shift control unit 118 that controls the gear changing motor 122 of the internal transmission 120. The assistance output control unit 119 is an example of a control section that is program to execute a control program to controls the drive assistance electric motor 142 according to a pedaling force detected by the pedaling force sensor 95.

The controller 117 receives information from sensors and commands resulting from operations performed by a person. More specifically, the controller 117 is electrically connected to the first shifter operating button 91, the second shifter operating button 92, the operating dial 93, the bicycle speed sensor 143, the pedaling force sensor 95, the crank rotational speed sensor 96, and the gear state sensor 98.

In an assist mode, the assistance output control unit 119 of the controller 117 controls the drive assistance motor 142 such that the drive assistance motor 142 generates an assistance force equal to the product of the rider's pedaling force and a prescribed value. The assistance output control unit 119 controls the drive assistance motor 142 according to a plurality of assist modes. More specifically, the assistance output control unit 119 has three assist modes, namely a high assist mode that assists with an assist force up to a maximum of 2 times the pedaling force, a medium assist mode that assists with an assist force up to a maximum of 1.5 times the pedaling force, and a low assist mode that assists with an assist force up to a maximum of 1 times the pedaling force. The assistance output control unit 119 also has an off mode in which it does not provide assistance. It is acceptable for the assist modes to be changed using a switch (not shown) provided on the handlebar unit 104 or using the operating dial 93.

The gear shift control unit 118 of the controller 117 serves to control the gear changing motor 122 so as to change the internally geared hub 121 to another gear. The gear shift control unit 118 either controls the gear changing motor 122 in accordance with a shift command issued in response to an operation of the first or second shifter operating button 91 or 92 or controls the gear changing motor 122 in accordance with a shift command generated automatically based on the bicycle speed.

If a person has selected the manual shifting mode by setting the operating dial 93 to the stop position M, then the gear shift control unit 118 executes an upshift gear change from a lower gear to a higher gear when the first shifter operating button 91 is pressed and executes a downshift gear change from a higher gear to a lower gear when the second shifter operating button 92 is pressed. That is, the gear shift control unit 118 determines that a command to change gears has been issued when either of the first and second shifter operating buttons 91 and 92 is pressed.

If a person has selected the automatic shifting mode by setting the operating dial 93 to the stop position A, then the gear shift control unit 118 determines if it is necessary to change gears based on bicycle speed information expressed by a signal from the bicycle speed sensor 143. If it determines that changing gears is necessary, then the gear shift control unit 118 sends a shift command to the motor driver 123, which drives the gear changing motor 122 of the internal transmission 120.

The control operations executed by the assistance output control unit 119 during a downshift gear change will now be explained with reference to FIG. 5. Regardless of whether the manual shifting mode or the automatic shifting mode is selected, during downshifting, the assistance output control unit 119 executes a control according to the flowchart shown in FIG. 5 to change the ratio of the output of the drive assistance motor 142 with respect to the pedaling force.

The reasons for changing the ratio of the output of the drive assistance motor 142 with respect to the pedaling force when downshifting are as follows. In both the manual shifting mode and the automatic shifting mode, downshifting often occurs when accelerating or when the bicycle speed decreases as one starts to climb a hill. Since the pedaling force decreases when the transmission is downshifted, the assistance force provided by the drive assistance motor 142 will decrease in accordance with the pedaling force if the output of the drive assistance motor 142 is controlled at a fixed ratio with respect to the pedaling force. As a result, the rider will feel that the assistance force is not sufficient. Conversely, if the ratio of the output of the drive assistance motor 142 with respect to the pedaling force is increased at the time of downshifting, then the decrease of the assistance force can be suppressed even as the rider's pedaling force decreases and the riding comfort can be improved.

When a gear shift request indicating a desire to change the gear of the internally geared hub 121 occurs, i.e., when a shift command is issued, in step S1 the assistance output control unit 119 determines if the gear shift request is a request to downshift. In the automatic shifting mode, the determination is made based on a shift command issued from the shift control unit 118. In the manual shifting mode, the determination is based on whether it was the second shifter operating button 92 that was operated. If it determines that the shift command is for a downshift gear change, then the assistance output control unit 119 proceeds from step S1 to step S2. If it determines that the shift command is not for a downshift gear change, then the assistance output control unit 119 skips the subsequent steps and ends the control sequence. In step S2, the assistance output control unit 119 waits for the downshift gear change (downshift operation) to be completed. Completion of the downshift gear change is determined based on, for example, a detection result of the gear state sensor 98. Thus, when the gear state sensor 98 detects that the internally geared hub 121 has transitioned from one gear to lower gear, the assistance output control unit 119 determines that the downshift gear change has been completed.

When the downshift gear change is completed, the assistance output control unit 119 proceeds from the step S2 to the step S3. In step S3, regardless of which assist mode is selected, the assistance output control unit 119 increases the assistance force delivered from the drive assistance motor 142 by sending a signal to the motor driver 141. More specifically, the assistance output control unit 119 increases the ratio of the output of the drive assistance motor 142 with respect to the pedaling force. For example, the ratio is increased such that it is 5% to 30% larger after being changed than before being changed. It is acceptable to set the value of the changed ratio separately for each gear. In such a case, the value of the changed gear ratio can be set differently for each gear and can be set to a gear ratio that is appropriate in accordance with the characteristics of the transmission. Regarding the changed gear ratio, it is also acceptable to provide an operating switch for changing the gear ratio on the operating unit 90 such that the gear ratio can be changed using the operating switch. However, the ratio of the output is only increased to an upper limit ratio of the particular assist mode (e.g., 1 times the pedaling force in the low assist mode, 1.5 times the pedaling force in the medium assist mode, and 2 times the pedaling force in the high assist mode) when the increase would cause the ratio of the output to exceed the upper limit.

Next, in step S4, the assistance output control unit 119 waits for the rotational speed of the crank 116 to exceed a prescribed crank rotational speed. It is acceptable for the prescribed crank rotational speed to be a preset rotational speed value that has been set in advance or a rotational speed value that is set based on the crank rotational speed detected immediately before the gear shifting operation. A preset rotational speed is set, for example, in the range from 15 to 25 rpm. Regarding the preset rotational speed, it is also acceptable to provide an operating switch for changing the preset rotational speed on the operating unit 90 such that the preset rotational speed can be changed using the operating switch. When the prescribed crank rotational speed is set based on the crank rotational speed detected immediately before the gear shifting operation, the prescribed crank rotational speed is set to, for example, a prescribed value in the range from 110% to 200% of the crank rotational speed detected immediately before the gear shifting operation or to a value obtained by multiplying the crank rotational speed detected immediately before the gear shifting operation by a preset multiplier. It is acceptable to set the prescribed crank rotational speed separately for each gear. In such a case, the value of the prescribed crank rotational speed can be set differently for each gear and can be set to a crank rotational speed that is appropriate in accordance with the characteristics of the transmission.

In step S4, the determination regarding the crank rotational speed is accomplished based on a detection result of the crank rotational speed sensor 96. The crank rotational speed sensor 96 outputs a pulse signal each time the crank 116 completes one rotation and the crank rotational speed can be detected based on the frequency of the pulse signals. When it determines that the crank rotational speed has exceeded the prescribed crank rotational speed, the assistance output control unit 119 then proceeds to step S5.

In step S5, the assistance output control unit 119 cancels the increased state of the output of the drive assistance motor 142 that was set in step S3. More specifically, the assistance output control unit 119 returns the ratio of the output of the drive assistance motor 142 with respect to the pedaling force from the increased state to the original ratio. As a result, the ratio of the output of the drive assistance motor 142 with respect to the pedaling force is decreased. When step S5 is completed, the output control sequence associated with the downshift gear change is ended. This process of FIG. 5 is carried out before a subsequent shift operation occurs.

Figure 5:
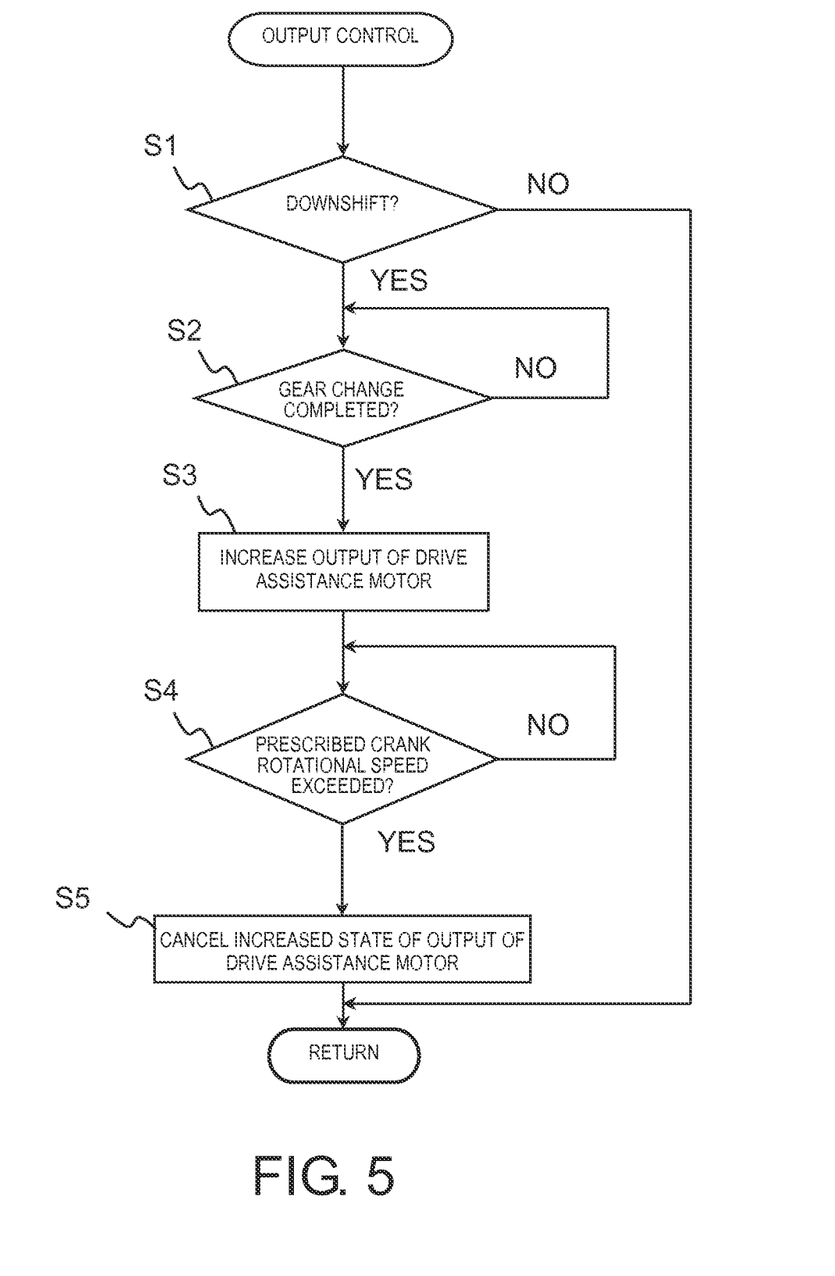
FIG. 5 is a flowchart showing control operations executed by the assistance output control unit.

If a subsequent shift operation occurs before step S2, after a shift down based on the subsequent shift operation completed, the assistance output control unit 119 of the controller 117 may proceed to the step S3 in FIG. 5. In this case, the ratio of output of the drive assistance motor 142 with respect to the pedaling force may be bigger than the ratio based on one shift down.

If a subsequent shift operation occurs in step S3 or S4, the assistance output control unit 119 of the controller 117 may maintain the increased the ratio of output of the drive assistance motor 142 with respect to the pedaling force and proceed from step S2 again. If a subsequent shift operation occurs in step S5, the assistance output control unit 119 of the controller 117 may stop the process of step S5 and maintain the increased the ratio of output of the drive assistance motor 142 with respect to the pedaling force and proceed from step S2 again.

Although completion of the gear change is determined in step S2 based on a detection result of the gear state sensor 98 provided in the internally geared hub 121, it is acceptable to determine that the downshift gear change has been completed when a prescribed small amount of time has elapsed since the shift command requesting the downshift gear change was issued. Although in step S4 the assistance output control unit 119 determines if the crank rotational speed has exceeded a prescribed crank rotational speed based on the detection result of the crank rotational speed sensor, the present invention is not limited to such a configuration. For example, it is acceptable to calculate the crank rotational speed based on the wheel rotational speed outputted from the bicycle speed sensor 143 and the gear state detected by the gear state sensor 98 and then use the calculated crank rotational speed to determine if the prescribed crank rotational speed has been exceeded.

While the first embodiment is an example in which the transmission of the bicycle is an internal transmission, the second embodiment is an example in which the transmission of the bicycle is an external transmission 220.

Figure 6:
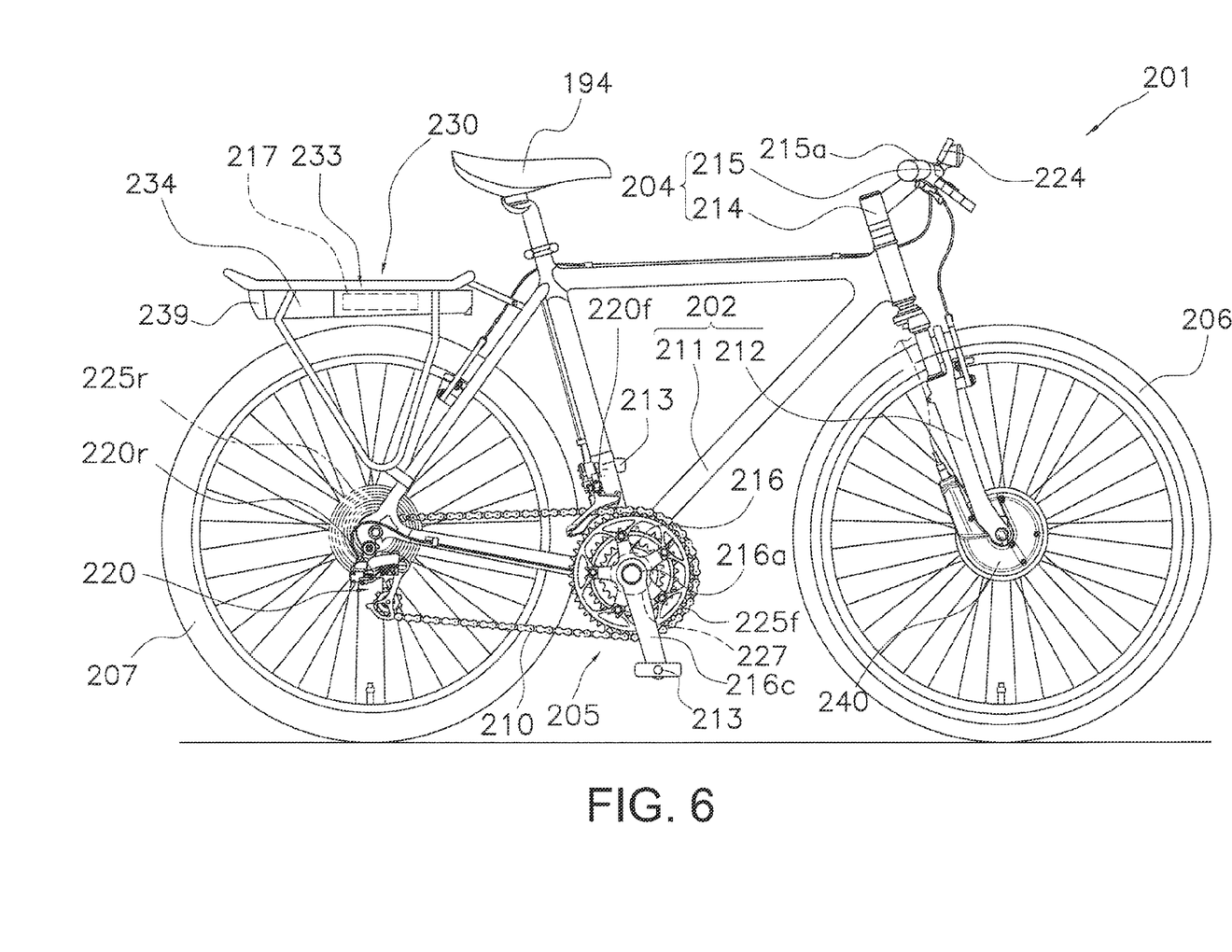
FIG. 6 is a side elevational view of a bicycle that is equipped with a bicycle control apparatus in accordance with a second embodiment.

FIG. 6 shows a bicycle 201 that employs a bicycle control apparatus according to the second embodiment. The bicycle 201 comprises chiefly a frame 202, a handlebar unit 204, a display device 224, a front wheel 206, a rear wheel 207, a chain 210, a crank 216, an external transmission 220, a rear carrier 230, a rechargeable battery 234, an assistance motor unit 240, a controller 217 that constitutes a part of bicycle control apparatus, and a front brake device and a rear brake device that are not shown in the drawings.

Figure 7:
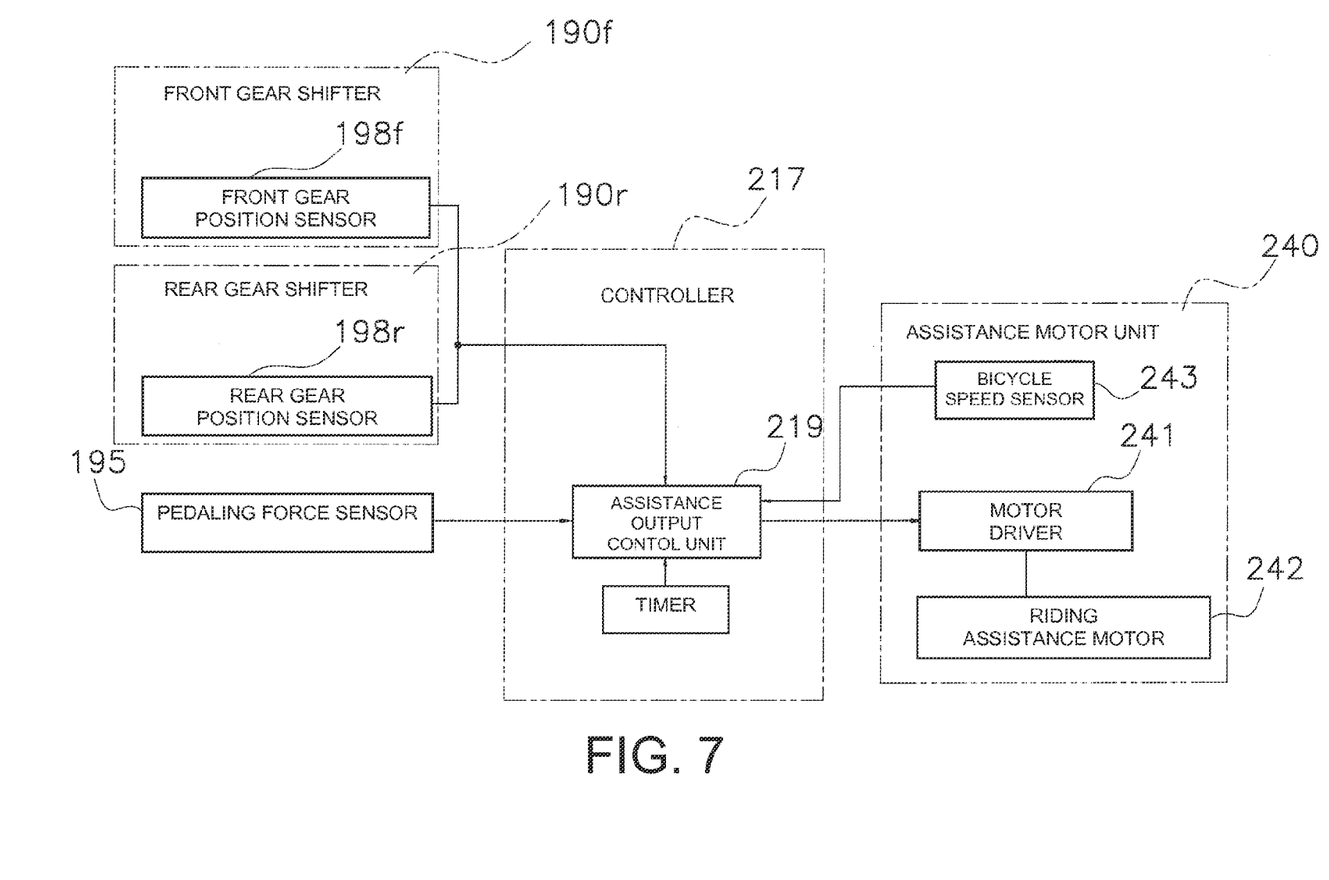
FIG. 7 is a block diagram, corresponding to FIG. 3, of the bicycle control apparatus in accordance with the second embodiment.

The frame 202, the crank 216, the handlebar unit 204, the rear carrier 230, the assistance motor unit 240, the pedaling three sensor 195, and the display device 224 are basically the same as in the first embodiment. Therefore, the reference numerals of these parts shown in FIGS. 6 and 7 are the reference numerals of the first embodiment with 100 added thereto and explanations of these parts are omitted. Meanwhile, the front fork 212 is provided with a suspension function. Also, the bicycle speed sensor 243 is used in the assistance output control and not in the gear shift control.

The external transmission 220 is a cable driven transmission connected to a front gear shifter 190f and a rear gear shifter 190r shown in FIG. 7, which are mounted on the handlebar unit 204 with shift cables. Thus, the controller 217 is not provided with a shift control unit as a functional section.

As shown in FIG. 7, the front gear shifter 190f is provided with a front gear position sensor 198f and the rear gear shifter 190r is provided with a rear gear position sensor 198r serving to detect the gear state. The front gear position sensor 198f and the rear gear position sensor 198r are examples of a gear state detecting component or gear state detector. The front gear position sensor 198f and the rear gear position sensor 198r are, for example, provided in the front gear shifter 190f and the rear gear shifter 190r, respectively, and detect the rotational positions of the cable winders of the shifters, which correspond to the gear positions. The front gear position sensor 198f and the rear gear position sensor 198r are realized with, for example, potentiometers.

The front gear shifter 190f is arranged, for example, on the handlebar 215 adjacent to the front brake lever on the inward side of a portion where the front brake lever is attached. The rear gear shifter 190r is arranged, for example, on the handlebar 215 adjacent to the rear brake lever on the inward side of a portion where the rear brake lever is attached.

The external transmission 220 comprises a front derailleur 220f and a rear derailleur 220r as shown in FIG. 6. The front derailleur 220f serves to place the chain 210 onto any one of a plurality of (e.g., three) front sprockets 225f having different diameters. The rear derailleur 220r serves to place the chain 210 onto any one of a plurality of (e.g., ten) rear sprockets 225r having different diameters.

The controller 217 constituting a part of the bicycle control apparatus is arranged inside the rear carrier unit 233 as explained previously and serves to control electrical components to which it is electrically connected. The controller 217 has the same hardware configuration as in the first embodiment. Regarding functional sections, the controller 217 does not have a shift control unit as explained previously, but it does have an assistance output control unit 219.

The controller 217 receives information from sensors and commands resulting from operations performed by a person. Specifically, the controller 217 is electrically connected to the front gear position sensor 198f, the rear gear position sensor 198r, the bicycle speed sensor 243, and the pedaling force sensor 195.

In an assist mode, similarly to the first embodiment, the assistance output control unit 219 of the controller 217 controls the drive assistance motor 242 such that the drive assistance motor 242 generates an assistance force equal to the product of the rider's pedaling force and a prescribed value.

The assistance output control unit 219 controls the drive assistance motor 242 according to a plurality of assist modes. The assistance output control unit 219 also has an off mode in which it does not provide assistance. It is acceptable for the assist modes to be changed using a switch (not shown) provided on the handlebar unit 204 or using a switch provided on the display device 224.

The control operations executed by the assistance output control unit 219 during a downshift gear change will now be explained with reference to FIG. 8. When downshifting occurs, the assistance output control unit 219 executes a control according to the flowchart shown in FIG. 8 to change the ratio of the output of the drive assistance motor 242 with respect to the pedaling force.

Figure 8:
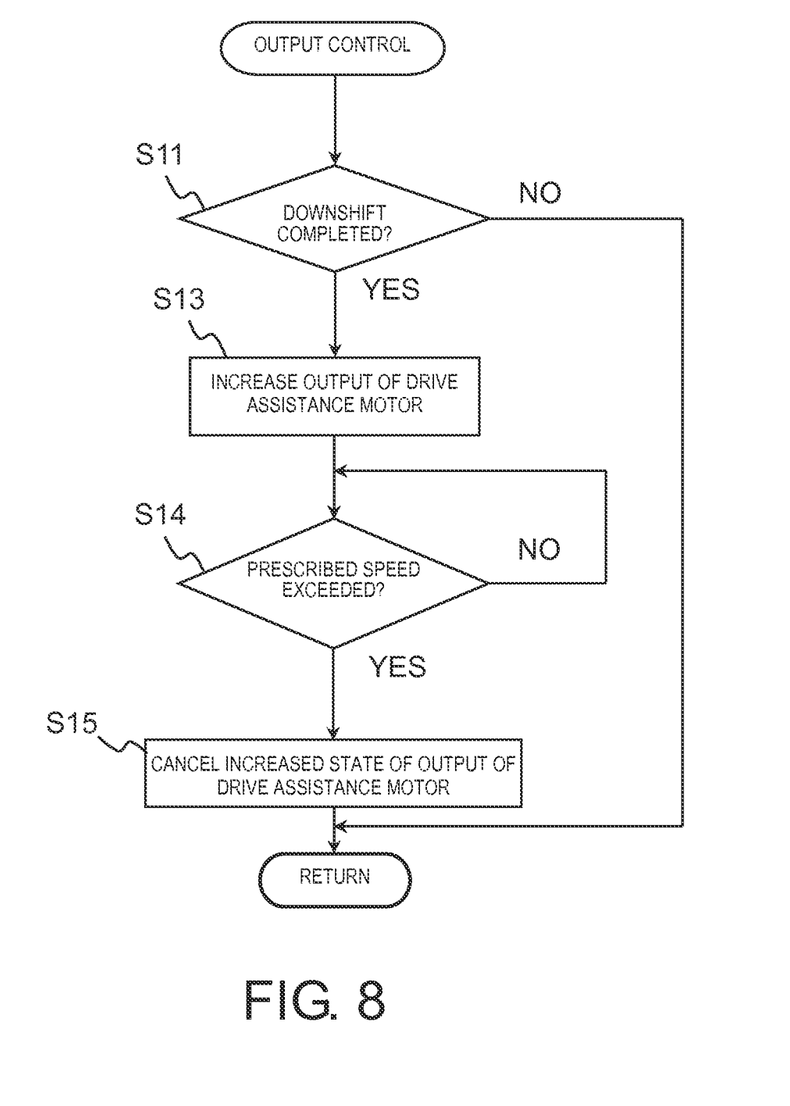
FIG. 8 is a flowchart, corresponding to FIG. 5, showing control operations executed by the assistance output control unit of the second embodiment.

In step S11 of FIG. 8, the assistance output control unit 219 determines if a downshift gear shifting operation has been executed and if the change to a lower gear has been completed. This determination is accomplished by determining if the front gear shifter 190f or the rear gear shifter 190r has been operated so as to execute a downshifting operation. More specifically, the assistance output control unit 219 determines that the downshift gear shifting operation has been completed when the shift position detected by the front gear position sensor 198f or the rear gear position sensor 198r changes to the downshift shift position. When it determines that the downshift gear shifting operation was executed and the downshift has been completed, the assistance output control unit 219 proceeds from step S11 to step S13. If it determines that the downshift gear change has not been completed, then the assistance output control unit 219 skips the subsequent steps and ends the control sequence.

In step S13, regardless of which assist mode is selected, the assistance output control unit 219 increases the assistance three delivered from the drive assistance motor 241 by sending a signal to the motor driver 242. More specifically, similarly to the first embodiment, the assistance output control unit 219 increases the ratio of the output of the drive assistance motor 242 with respect to the pedaling force to a higher ratio. However, the ratio is only increased to an upper limit ratio of the particular assist mode (e.g., 1 times the pedaling force in the low assist mode, 1.5 times the pedaling force in the medium assist mode, and 2 times the pedaling force in the high assist mode) when the increase would cause the ratio of the output to exceed the upper limit. Next, in step S14, the assistance output control unit 219 waits for the speed of the bicycle 201 to exceed a prescribed speed. It is acceptable for the prescribed speed to be a preset speed or, for example, a speed set based on the speed detected immediately before the gear shifting operation occurred. The preset speed is set, for example, in the range from 5 km/h to 10 km/h. Regarding the preset speed, it is also acceptable to provide an operating switch for changing the preset speed on the operating unit 90 such that the preset speed can be changed using the operating switch. When the prescribed speed is set based on the speed detected immediately before the gear shifting operation, the prescribed speed is set to, for example, a prescribed value in the range from 70% to 100% of the speed detected immediately before the gear shifting operation or to a value obtained by multiplying the speed detected immediately before the gear shifting operation by a preset multiplier. It is acceptable to set the value of the prescribed speed separately for each gear. In such a case, the value of the prescribed speed can be set differently for each gear and can be set to a speed that is appropriate in accordance with the characteristics of the transmission.

The determination executed in step S13 is accomplished based, for example, on a detection result of the bicycle speed sensor 243. If a crank rotational speed sensor is used instead of a bicycle speed sensor, a gear ratio can be calculated based on the detection result of the crank rotational speed sensor and the detection results of the front gear position sensor 198f and the rear gear position sensor 198r, and the bicycle speed can be calculated by multiplying the gear ratio by the crank rotational speed obtained from the crank rotational speed sensor. In such a case, instead of determining if the bicycle speed has exceeded a prescribed speed, it is also acceptable to determine if the crank rotational speed has exceeded a prescribed crank rotational speed based on the detection result of the crank rotational speed sensor as is done in the first embodiment. Thus, in the second embodiment, the bicycle speed sensor 243 is an example of a prescribed condition detection section or a prescribed condition detector.

When it determines that the bicycle speed has exceeded the prescribed speed, the assistance output control unit 219 proceeds to step S15. In step S15, the assistance output control unit 219 cancels the increased state of the output of the drive assistance motor 142 that was set in step S13. More specifically, the assistance output control unit 219 returns the ratio of the output of the drive assistance motor 242 with respect to the pedaling force from the increased state to the original ratio. As a result, the ratio of the output of the drive assistance motor 242 with respect to the pedaling force is decreased. When step S15 is completed, the output control sequence associated with the downshift gear change is ended. This process of FIG. 8 is carried out before a subsequent shift operation occurs.

If a subsequent shift operation occurs before step S11, after a shift down based on the subsequent shift operation completed, the assistance output control unit 119 of the controller 117 may proceed to the step S13 in FIG. 8. In this case, the ratio of output of the drive assistance motor 142 with respect to the pedaling force may be bigger than the ratio based on one shift down.

If a subsequent shift operation occurs in step S13 or S14, the assistance output control unit 119 of the controller 117 may maintain the increased the ratio of output of the drive assistance motor 142 with respect to the pedaling force and proceed from step S11 again. If a subsequent shift operation occurs in step S15, the assistance output control unit 119 of the controller 117 may stop the process of step S15 and maintain the increased the ratio of output of the drive assistance motor 142 with respect to the pedaling force and proceed from step S11 again.

In step S11, the determination of whether the downshift gear change has been completed is accomplished based on the detection result of the front gear position sensor 198f or the rear gear position sensor 198r and a determination of whether a downshift operation occurred is not executed. However, it is acceptable to execute a determination of whether a downshift operation was performed. For example, a potentiometer normally provided on the cable winder of each of the front gear shifter and the rear gear shifter detects if the cable winder rotates in a wind-in direction or a release direction. Based on the output signal of the sensor, it can be determined if a downshift operation occurred by detecting if the cable winder rotated in the wind-in direction or the release direction.

Thus, even though the transmission is manual, by increasing the ratio of the output of the drive assistance motor 142 with respect to the pedaling force at the time of downshifting, the decrease of the assistance force can be suppressed even as the rider's pedaling force decreases and the riding comfort can be improved in the same manner as in the first embodiment.

Although an embodiment of a bicycle control apparatus according to the present invention has been presented heretofore, the present invention is not limited to the embodiment and various modifications can be made without departing from the scope of the invention as defined by the claims.

In the first embodiment, the bicycle 101 has the internally geared hub 121 of the internal transmission 120, which is installed on the rear wheel 107. Instead, it is acceptable for the bicycle control apparatus to be employed in a bicycle having a transmission that is installed on the crank axle and configured to change gears using a planetary gear mechanism.

Figure 9:
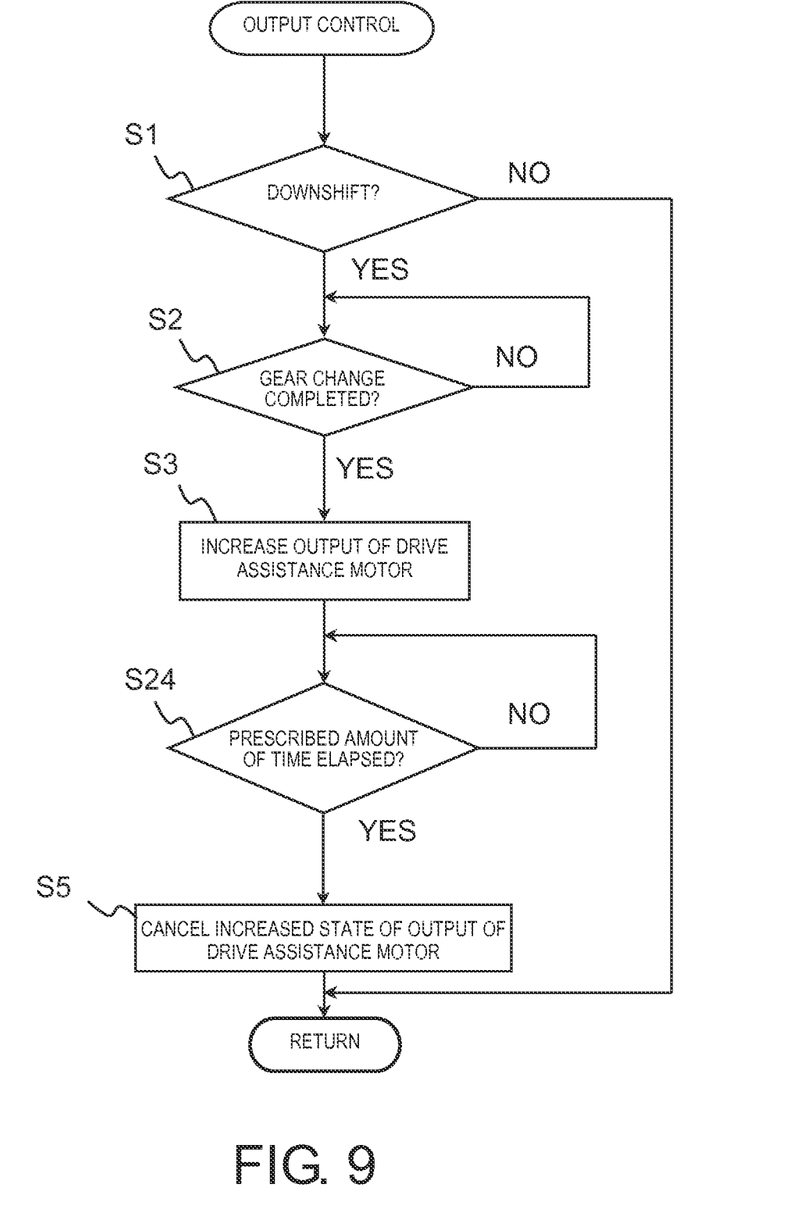
FIG. 9 is a flowchart, corresponding to FIG. 5, showing control operations executed by the assistance output control unit of another embodiment.

Although in the previously explained embodiments the ratio of the output of the drive assistance motor to the pedaling force is returned from the increased state to its original value when the crank rotational speed exceeds the prescribed crank rotational speed or when the bicycle speed exceeds the prescribed bicycle speed, the invention is not limited to returning the ratio to its original value at either of these timings. For example, as shown in FIG. 9, it is acceptable to return the ratio of the drive assistance motor to the pedaling force to its original value when a prescribed amount of time has elapsed since the ratio was increased. The elapse of the prescribed time can be measured with the timer 126 contained in the controller 117. Thus, if the prescribed time is used to determine when to return the ratio to its original value, then the timer 126 is an example of the prescribed condition detecting section or the prescribed condition detector. As a result, the ratio of the output of the drive assistance motor to the pedaling force can be returned to its original value from the increased state without providing a prescribed condition detecting section separate from the controller 117 for returning the ratio. Other than step S24, the operations shown in FIG. 9 are the same as in the first embodiment.

In the previously explained embodiments, the assistance motor unit 140 is attached to the front wheel 106. Instead, it is acceptable to provide an assistance motor unit on the rear wheel or on the frame. If the assistance motor unit is provided on the frame, then, for example, the assistance motor unit can be attached to the down tube or the seat tube and it can drive the crank, a front sprocket, the chain, or the rear wheel.

In the previously explained embodiments, the assistance output control unit 119 or 219 controls the drive assistance motor 142 or 242 based on the output of the pedaling force sensor 95 or 195, which detects the torque acting on the crank axle. Instead of the pedaling force sensor 95 or 195, it is acceptable to provide a sensor that detects a depression force of a pedal or a sensor that detects the tension of the chain. The assistance output control unit 119 or 219 could then control the drive assistance motor 142 or 242 based on the information from such a sensor.

In the previously explained embodiments, the internal transmission is electrically driven and the external transmission is cable driven. However, it is acceptable for the internal transmission to be cable driven. It is also acceptable for the external transmission to be electrically driven. In the case of electric drive, it is acceptable to increase the ratio of the output of the drive assistance motor with respect to the pedaling force when the downshift gear change is determined to have been completed after it has been determined that the downshift operation started. In the case of cable drive, it is acceptable to increase the ratio of the output of the drive assistance motor with respect to the pedaling force when it is merely determined that the downshift gear change has been completed. In the case of electric drive, too, it is acceptable to omit determining if a downshift operation has started and to increase the ratio of the output of the drive assistance motor with respect to the pedaling force when it is merely determined that the downshift gear change has been completed.

In the previously explained embodiments, it is acceptable to execute the controls shown in FIGS. 5, 8 and 9 only when the traveling speed of the bicycle is equal to or smaller than a prescribed speed. The prescribed speed is set, for example, to a speed at which the drive assistance motor should be stopped, e.g., 4 km/h.

In the previously explained embodiments, it is acceptable to vary the ratio by which the ratio of the output of the drive assistance motor 142 with respect to the pedaling force is increased in step S3 of FIG. 5, step S13 of FIG. 8, and step S3 of FIG. 9 depending on whether the traveling speed of the bicycle is equal to or smaller than a first traveling speed or larger than the first traveling speed. The ratio of the output of the drive assistance motor 142 to the pedaling force is increased more when the traveling speed of the bicycle is equal to or smaller than the first traveling speed than when the traveling speed of the bicycle is larger than the first traveling speed. In this case, too, it is acceptable to execute the control shown in FIG. 5, FIG. 8, and FIG. 9 only when the traveling speed of the bicycle is equal to or smaller than a second traveling speed that is larger than the first traveling speed.

In the previously explained embodiments, the front gear position sensor 198f is provided in the front gear shifter 190f and the rear gear position sensor 198r is provided in the rear gear shifter 190r. However, it is acceptable to provide a front gear position sensor on the front transmission and a rear gear position sensor on the rear transmission. In such a case, if the transmissions are cable driven, then the front gear position sensor and the rear gear position sensor are, for example, configured to detect an angle of a link member in the link structures of the transmissions. If the transmissions are electrically driven, then the front gear position sensor and the rear gear position sensor are configured to detect a rotational angle of a motor or a gear serving to drive the respective transmission.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control apparatus configured to control a bicycle having a transmission and a drive assistance electric motor that drives a wheel, the bicycle control apparatus comprising:
   a pedaling force detector that detects a pedaling force; and
   a controller including a control section that controls the drive assistance electric motor according to a pedaling force detected by the pedaling force detector, the control section increasing a ratio of an output of the drive assistance electric motor with respect to the pedaling force upon completion of a downshift of the transmission, and subsequently decreasing the ratio of the output of the drive assistance electric motor with respect to the pedaling force.

2. The bicycle control apparatus as recited in claim 1, further comprising
a gear state detector configured to detect a transmission state of the transmission, and
the control section determining if the downshift operation of the transmission has been completed based on a detection result of the gear state detector.

3. The bicycle control apparatus as recited in claim 1, further comprising
a gear shifter configured to executes a gear shifting operation of the transmission; and a gear state detector configured to detect a position the gear shifter, the control section determining if the downshift operation of the transmission has been completed based on a detection result of the gear state detector.

4. The bicycle control apparatus as recited in claim 1, wherein
the control section decreases the ratio of the output of the drive assistance electric motor with respect to the pedaling force by returning the ratio of the output of the drive assistance electric motor to a state that existed before the ratio was increased.

5. The bicycle control apparatus as recited in claim 1, further comprising
a prescribed condition detector configured to detect a prescribed condition, and the control section decreasing the ratio of the output of the drive assistance electric motor with respect to the pedaling force upon the prescribed condition detector detects a prescribed condition.

6. The bicycle control apparatus as recited in claim 5, wherein
the prescribed condition detector detects the prescribed condition as a rotational speed of a crank of the bicycle exceeding a prescribed rotational speed.

7. The bicycle control apparatus as recited in claim 6, wherein
the prescribed condition detector is a crank rotational speed sensor that detects the rotational speed of the crank of the bicycle.

8. The bicycle control apparatus as recited in claim 5, wherein
the prescribed condition detector detects the prescribed condition upon a prescribed amount of time elapsing since the downshift of the transmission was detected as being complete.

9. The bicycle control apparatus as recited in claim 8, wherein
the prescribed condition detector comprises a timer.

10. The bicycle control apparatus as recited in claim 1, wherein
the transmission is an internal transmission.

11. The bicycle control apparatus as recited in claim 1, wherein
the transmission is an external transmission.

12. The bicycle control apparatus as recited in claim 1, wherein
the drive assistance electric motor is configured to be mounted on one of a front wheel and a rear wheel of the bicycle, or a bicycle frame of the bicycle.

13. A bicycle control method for controlling a bicycle having a transmission and a drive assistance electric motor that drives a wheel, the method comprising:
detecting a pedaling force applied to the bicycle; and
increasing a ratio of the output of the drive assistance electric motor with respect to the pedaling force upon detecting the a downshift operation of the transmission is completed, and
subsequently decreasing a ratio of an output of the drive assistance electric motor with respect to the pedaling force.

* * * * *